United States Patent [19]

Matsuno et al.

[11] 4,384,088
[45] May 17, 1983

[54] PROCESS FOR PREPARING POLYOLEFINS

[75] Inventors: Mitsuo Matsuno; Etsuo Kawamata, both of Kawasaki; Nobuyuki Kuroda, Yokohama; Kazuo Matsuura; Mitsuji Miyoshi, both of Kawasaki, all of Japan

[73] Assignee: Nippon Oil Company, Limited, Tokyo, Japan

[21] Appl. No.: 913,507

[22] Filed: Jun. 7, 1978

[30] Foreign Application Priority Data

Jun. 17, 1977 [JP] Japan ............................. 52-71080
Jun. 24, 1977 [JP] Japan ............................. 52-74330

[51] Int. Cl.$^2$ .......................... C08F 4/02; C08F 10/02
[52] U.S. Cl. ............................ 526/116; 252/429 B; 252/429 C; 526/124; 526/125; 526/352; 526/906
[58] Field of Search ............................. 526/116, 124

[56] References Cited

U.S. PATENT DOCUMENTS

| 3,658,722 | 4/1972 | Delbouille et al. | 526/124 |
| 3,718,635 | 2/1973 | Tomoshige et al. | 526/124 |
| 3,745,154 | 7/1973 | Kashiwa | 526/124 |
| 4,022,958 | 5/1977 | Matsuura et al. | 526/124 |

FOREIGN PATENT DOCUMENTS 7113010  4/1972  Netherlands ...................... 526/124

Primary Examiner—Edward J. Smith
Attorney, Agent, or Firm—Cooper, Dunham, Clark, Griffin & Moran

[57] ABSTRACT

According to this invention, there is provided a process for preparing polyolefins wherein olefins are polymerized or copolymerized using as catalyst a solid component and an organometallic compound, characterized in that said solid component is a substance obtained by the copulverization of:
(1) a reaction product resulting from a heat reaction of magnesium oxide and aluminum trichloride,
(2) a titanium compound and/or a vanadium compound, and
(3) if desired, an organic halide.

8 Claims, No Drawings

PROCESS FOR PREPARING POLYOLEFINS

BACKGROUND OF THE INVENTION (1) Field of the Invention

This invention relates to a process for preparing polyolefins using a new polymerization catalyst. More particularly, it is concerned with a process for polymerizing olefins, characterized in that olefins are polymerized or copolymerized using as catalyst a solid component and an organometallic compound in combination, said solid component being obtained by the copulverization of (1) a reaction product resulting from a heat reaction of magnesium oxide and aluminum trichloride, (2) a titanium compound and/or a vanadium compound and (3) if desired, an organic halide, whereby the polymer yield per solid and that per transition metal are remarkably increased, resulting in that the step for removing the residual catalyst in polymer is no longer needed, and further the molecular weight distribution of the resulting polymer is widened and the fluidity of the molten resin is improved. In addition to the advantages mentioned above, when the solid component containing the organic halide of the above (3) is used, the bulk density of the resulting polymer becomes higher.

(2) Description of the Prior Art

In the technical field of this sort there have heretofore been known many catalysts consisting of an inorganic magnesium solid as carrier such as magnesium halide, magnesium oxide and magnesium hydroxide, and a compound of a transition metal such as titanium and vanadium supported on the carrier (see, for example, Japanese Patent Publication Nos. 13050/1968 and 9548/1970). However, polyolefins prepared by the use of such carrier are comparatively narrow in molecular weight distribution. In practical use, in such a field as injection molding they are desirable in some cases, but in such fields as extrusion and blow molding their molded articles are inferior in surface condition, for example, a goose skin is formed on their surfaces, and thus there occurs a serious drawback in practical use. Of course, even in the case of using such conventional carrier, it is possible to widen the molecular weight distribution to some extent by selecting the polymerization temperature and a co-catalyst. But it has heretofore been impossible to widen the molecular weight distribution up to a substantially satisfactory extent.

In Japanese Patent Publication No. 11806/1972 mention is made of a solid catalyst prepared in such a manner that a trivalent metal halide and the oxide of a metal from Groups I–VIII of the Periodic Table are merely mixed together without subjected to a burning reaction and a titanium compound and/or a vanadium compound are (is) reacted therewith in the presence of an aromatic compound. However, in the absence of an aromatic compound, there is not obtained therein a solid catalyst of high activity, and the said publication does not refer at all to the molecular weight distribution of the resulting polymer. Besides, the bulk density of the resulting polymer is low.

Having made a keen study about a high activity catalyst which affords a polyolefin having a wide molecular weight distribution, that is, having a large flow parameter, we now found that if olefins are polymerized or copolymerized using as catalyst a solid component and an organometallic compound, said solid component being obtained by the copulverization of (1) a reaction product resulting from a heat reaction of magnesium oxide and aluminum trichloride, (2) a titanium compound and/or a vanadium compound and (3) if desired, an organic halide, there can be obtained in high catalytic efficiency a polyolefin having a wide molecular weight distribution, that is, having a large flow parameter, and that if such a polyolefin is used in extrusion, there can be obtained a molding superior in surface condition and thus the foregoing technical problems in practical use can be solved. In this way, we have completed the present invention. In addition to the above effects, when the solid component containing the organic halide of the above (3) is used there is brought about an advantage such that a polymer having a higher bulk density is obtained in a powdered state.

Polyolefins having a wide molecular weight distribution are characterized in that their flow parameter which is defined by the following equation is large. Hereinafter also in the present invention the flow parameter will be used as a parameter indicative of the molecular weight distribution.

$$\text{Flow Parameter} = \log\left(\frac{\text{Melt index for 21.6Kg load}}{\text{Melt index for 2.16Kg load}}\right)$$

Although the structure of the catalyst obtained in the present invention is not clear, it cannot but be considered surprising that according to the process of the present invention there have been obtained polyolefins having a high activity and a wide molecular weight distribution and whose bulk density is extremely large (specially when the organic halide of the foregoing (3) is used at the same time).

The reaction ratio between magnesium oxide and aluminum trichloride used in the present invention is such that the Al/Mg atomic ratio ranges from 0.3 to 5, preferably from 0.5 to 2 and more preferably from 0.6 to 1.5. As the reaction conditions of both, there are used conditions for a burning reaction of both. The reaction temperature ranges from 150° to 600° C., preferably from 200° to 500° C. and most preferably from 250° to 400° C. The reaction time is not specially restricted, but usually the reaction can be carried out in the period of time ranging from 1 minute to 10 hours. The method of burning reaction is not specially restricted, either, but it is convenient to make a burning reaction in solid phase. The kind of magnesium oxide to be used is not specially restricted, but those containing as less hydroxyl group as possible are desirable.

As to the titanium compound used in the present invention, there is no special limitation placed thereon. Examples of a tetravalent titanium compound are titanium tetrachloride, titanium tetrabromide, titanium tetraiodide, monoethoxytrichlorotitanium, diethoxydichlorotitanium, triethoxymonochlorotitanium, tetraethoxytitanium, monoisopropoxytrichlorotitanium, diisopropoxydichlorotitanium, tetraisopropoxytitanium, the reaction product of silicon tetrachloride and titanium alkoxide, and mixtures thereof.

Trivalent titanium compounds which may be used in the present invention are not specially restricted. For example, there may be employed various titanium trihalides obtained by reducing titanium tetrahalides by hydrogen, aluminum, titanium or organometallic compound, and compounds obtained by reducing various tetravalent alkoxytitanium halides by an organometallic compound.

The organic halide used in the present invention when it is desired to obtain a polymer having a high bulk density, is a compound resulting from a partial substitution by halogen of an aliphatic or aromatic hydrocarbon, etc. Examples are methylene chloride, chloroform, carbon tetrachloride, bromochloromethane, dichlorodifluoromethane, 1-bromo-2-chloroethane, chloroethane, 1,2-dibromo-1,1-dichloroethane, 1,1-dichloroethane, 1,2-dichloroethane, 1,2-dichloro-1,1,2,2-tetrafluoroethane, hexachloroethane, pentachloroethane, 1,1,1,2-tetrachloroethane, 1,1,2,2-tetrachloroethane, 1,1,1-trichloroethane, 1,1,2-trichloroethane, 1-chloropropane, 2-chloropropane, 1,2-dichloropropane, 1,3-dichloropropane, 2,2-dichloropropane, 1,1,1,2,2,3,3-heptachloropropane, 1,1,2,2,3,3-hexachloropropane, octachloropropane, 1,1,2-trichloropropane, 1-chlorobutane, 2-chlorobutane, 1-chloro-2-methylpropane, 2-chloro-2-methylpropane, 1,2-dichlorobutane, 1,3-dichlorobutane, 1,4-dichlorobutane, 2,2-dichlorobutane, 1-chloropentane, 1-chlorohexane, 1-chloroheptane, 1-chlorooctane, 1-chlorononane, 1-chlorodecane, vinyl chloride, 1,1-dichloroethylene, 1,2-dichloroethylene, tetrachloroethylene, 3-chloro-1-propene, 1,3-dichloropropene, chloroprene, oleyl chloride, chlorobenzene, chloronaphthalene, benzyl chloride, benzylidene chloride, chloroethylbenzene, styrene dichloride, and α-chlorocumene.

To illustrate the vanadium compound used in the present invention, mention may be made of tetravalent vanadium compounds, e.g. vanadium tetrachloride; pentavalent vanadium compounds, e.g. vanadium oxytrichloride and orthoalkylvanadate; and trivalent vanadium compounds, e.g. vanadium trichloride and vanadium triethoxide.

Using a titanium compound and a vanadium compound together is often adopted to make the present invention further effective. In this case, the V/Ti molar ratio is preferably in the range of from 2/1 to 0.01/1.

The quantity of a titanium compound and/or a vanadium compound to be supported is preferably adjusted so that the quantity of titanium and/or vanadium contained in the resulting solid is in the range of from 0.5 to 10% by weight. To attain a well-balanced activity per titanium and/or vanadium and that per solid, the range of from 1 to 8% by weight is specially desirable.

The method of copulverization of (1) a reaction product resulting from a heat reaction of magnesium oxide and aluminum trichloride, (2) a titanium compound and/or a vanadium compound and (3) if desired, an organic halide in the present invention, is not specially restricted. The copulverization may be done in a simultaneous presence of all such components; or it may be carried out by first pulverizing the product of heat reaction of the above (1) and an organic halide together and then adding a titanium compound and/or a vanadium compound followed by a further pulverization; or the reaction product of an organic halide and a titanium compound and/or a vanadium compound may be pulverized together with the product of heat reaction of the foregoing (1).

The mixing ratio between the product of heat reaction of the foregoing (1) and an organic halide of (3) is not specially restricted, but with a too large quantity of the latter, the polymerizability tends to lower, while with a too small quantity thereof, the effect of addition of the organic halide cannot be expected. Therefore, it is preferable that the weight ratio of the product of heat reaction of the foregoing (1) to organic halide be in the range of from 1:0.5 to 1:0.01.

There is no special limitation placed on the apparatus used for the copulverization, but usually employed are a ball mill, a vibration mill, a rod mill and an impact mill. Conditions such as the pulverization temperature and the pulverization time can be decided easily by those skilled in the art according to the pulverizing method. In general, the pulverization temperature ranges from 0° to 200° C. and preferably from 20° to 100° C., and the pulverization time from 0.5 to 50 hours and preferably from 1 to 30 hours.

As the organometallic compound used in the present invention, there may be employed organic compounds of metals from Groups I–IV of the Periodic Table which compounds are known to be one component of a Ziegler catalyst. Specially preferred are organoaluminum compounds and organozinc compounds. To be more specific, organoaluminum compounds represented by the general formulae, $R_3Al$, $R_2AlX$, $RAlX_2$, $R_2AlOR$, $RAl(OR)X$ and $R_3Al_2X_3$ wherein R is alkyl or aryl having 1 to 20 carbon atoms and may be the same or different and X is halogen, and organozinc compounds represented by the general formula, $R_2Zn$ wherein R is alkyl having 1 to 20 carbon atoms and may be the same or different; examples are triethylaluminum, triisobutylaluminum, trihexylaluminum, trioctylaluminum, diethylaluminum chloride, ethylaluminum sesquichloride, diethylzinc, and mixtures thereof.

In the present invention, the quantity of an organometallic compound to be used is not specially restricted, but usually ranges from 0.1 to 1000 moles per mole of a titanium compound and/or a vanadium compound.

The olefin polymerizing reaction using the catalyst of the present invention is carried out in the same manner as in the conventional olefin polymerizing reaction using a Ziegler catalyst; that is, a substantially oxygen- and moisture-free condition is maintained throughout the reaction. The olefin polymerizing conditions include temperatures ranging from 20° to 120° C. and preferably from 50° to 100° C., and pressures from atmospheric to 70 Kg/cm$^2$.G and preferably from 2 to 60 Kg/cm$^2$.G. Adjustment of the molecular weight can be made to some extent by changing the polymerization conditions such as the polymerization temperature and the molar ratio of catalyst, but can be made effectively by adding hydrogen into the polymerization system. Of course, using the catalyst of the present invention there can be effected, without any trouble, a two or more stage polymerization reaction having different polymerization conditions such as different hydrogen concentrations and different polymerization temperatures.

The process of the present invention is applicable to the polymerization of all olefins that are polymerizable with a Ziegler catalyst. For example, it is suitably used for the homopolymerization of α-olefins such as ethylene, propylene and 1-butene, and for the copolymerization of ethylene and 1-butene, and propylene and 1-butene. Moreover, the copolymerization with dienes with the object of modifying polyolefins, for example, the copolymerization of ethylene and butadiene, ethylene and 1,4-hexadiene, is also conducted as a desirable application.

DESCRIPTION OF PREFERRED EMBODIMENTS

Examples of the present invention are given below, but it is to be understood that these are for explanation for working the present invention and that the invention is not limited thereto.

EXAMPLE 1

(a) Preparation of Catalyst 40 g of magnesium oxide and 133 g of aluminum trichloride were reacted together under heating at 300° C. for 4 hours. 9.5 g of the reaction product and 1.7 g of titanium tetrachloride were placed in a stainless steel pot having a content volume of 400 ml and containing 25 stainless steel balls each ½ inch in diameter, and a ball milling was performed for 16 hours at room temperature and under a nitrogen atmosphere. The resulting powdered solid contained 39 mg of titanium per gram of the solid.

(b) Polymerization

A 2 liter, stainless steel autoclave equipped with an induction stirrer was purged with nitrogen and 1000 ml of hexane was placed therein, then 1 millimole of triethylaluminum and 10 mg of the powdered solid obtained above were added and the temperature was raised to 85° C. with stirring. The reaction system, which was 1.7 Kg/cm$^2$.G due to the vapor pressure of hexane, was pressurized with hydrogen to a total pressure of 4.2 Kg/cm$^2$.G and then with ethylene to a total pressure of 10 Kg/cm$^2$.G, and thus a polymerization was started. The polymerization was continued for 1 hour while introducing ethylene continuously to maintain the total pressure at 10 Kg/cm$^2$.G. Then, the polymer slurry was transferred into a beaker and the hexane removed under reduced pressure to give 96 g of a white polyethylene having a melt index of 0.75, bulk density of 0.13 and flow parameter of 1.72. The catalyst activity was 1650 g.polyethylene/g.solid.hr.C$_2$H$_4$ pressure. Thus, the polyethylene had a wide molecular weight distribution and it was obtained in extremely high activity.

COMPARATIVE EXAMPLE 1

A catalyst was prepared in the same way as in Example 1 except that aluminum trichloride was not used, and a polymerization was made for 1 hour in the same manner as in Example 1. As a result, only a trace amount of polymer was obtained and the activity was extremely low.

COMPARATIVE EXAMPLE 2

A catalyst was prepared in the same way as in Example 1 except that magnesium oxide and aluminum trichloride were not heat-reacted, but pulverized together, and a polymerization was made for 1 hour in the same manner as in Example 1. As a result, only 15 g of polymer having a melt index of 0.51 was obtained and the activity was extremely low.

EXAMPLE 2

40 g of magnesium oxide and 133 g of aluminum trichloride were reacted together under heating at 250° C. for 5 hours. 9.5 g of the reaction product and 1.7 g of titanium tetrachloride were placed in the ball mill pot described in Example 1, and a ball milling was performed for 16 hours at room temperature and under a nitrogen atmosphere. The resulting powdered solid contained 40 mg of titanium per gram of the solid.

Using 10 mg of the powdered solid prepared above, a polymerization was made for 1 hour in the same procedure as in Example 1 to yield 93 g of a white polyethylene having a melt index of 0.70 and a flow parameter of 1.70. The activity was 1600 g./g.solid.hr.C$_2$H$_4$ pressure. Thus, the polymer had a wide molecular weight distribution and it was obtained in extremely high activity.

EXAMPLE 3

120 g of magnesium oxide and 266 g of aluminum trichloride were reacted together under heating at 400° C. for 2 hours. 11 g of the reaction product and 2.2 g of a titanium trichloride eutectic mixture (TiCl$_3$.1/3AlCl$_3$) were placed in the ball mill pot described in Example 1, and a ball milling was performed for 16 hours at room temperature and under a nitrogen atmosphere. The resulting powdered solid contained 39 mg of titanium per gram of the solid.

Using 10 mg of the powdered solid prepared above, a polymerization was made for 1 hour in the same procedure as in Example 1 to yield 90 g of a white polyethylene having a melt index of 0.55 and a flow parameter of 1.76. The activity was 1550 g./g.solid.hr.C$_2$H$_4$ pressure. Thus, the polymer had a wide molecular weight distribution and it was obtained in extremely high activity.

EXAMPLE 4

40 g of magnesium oxide and 266 g of aluminum trichloride were reacted together under heating at 300° C. for 4 hours. 9.5 g of the reaction product and 1.7 g of titanium tetrachloride were placed in the ball mill pot described in Example 1, and a ball milling was performed for 16 hours at room temperature and under a nitrogen atmosphere. The resulting powdered solid contained 41 mg of titanium per gram of the solid.

Using 10 mg of the powdered solid prepared above, a polymerization was made for 1 hour in the same procedure as in Example 1 to yield 100 g of a white polyethylene having a melt index of 0.72 and a flow parameter of 1.70. The activity was 1720 g./g.solid.hr.C$_2$H$_4$ pressure.

EXAMPLE 5

In the same manner as in Example 1, 1000 ml of hexane, 1 millimole of triethylaluminum and 10 mg of the powdered solid prepared in Example 1 were placed in the autoclave and the temperature was raised to 85° C. Then, hydrogen was introduced to a total pressure of 4.2 Kg/cm$^2$.G and subsequently an ethylene-propylene gas containing 2 mole % of propylene was introduced so as to maintain the pressure in the autoclave at 10 Kg/cm$^2$.G, under which condition a polymerization was made for 1 hour to yield 102 g of a white polyethylene having 5.1 methyl groups per 1000 carbon atoms and having a melt index of 0.80 and flow parameter of 1.70. The catalyst activity was 1760 g.polymer/g.solid.hr.C$_2$H$_4$ pressure.

EXAMPLE 6

(a) Preparation of Catalyst 40 g of magnesium oxide and 133 g of aluminum trichloride were reacted together under heating at 300° C. for 4 hours. 10 g of the reaction product, 1 g of chloroform and 2.1 g of titanium tetrachloride were placed in a stainless steel pot having a content volume of 400 ml and containing 25 stainless steel balls each ½ inch in diameter, and a ball milling was performed for 16 hours at room temperature and under a nitrogen atmosphere. The resulting powdered solid contained 41 mg of titanium per gram of the solid.

(b) Polymerization

A 2 liter, stainless steel autoclave equipped with an induction stirrer was purged with nitrogen and 1000 ml of hexane was placed therein, then 1 millimole of triethylaluminum and 30 mg of the powdered solid obtained above were added and the temperature was raised to 85° C. with stirring. The reaction system, which was 1.7 Kg/cm$^2$.G due to the vapor pressure of hexane, was pressurized with hydrogen to a total pressure of 4.2 Kg/cm$^2$.G and then with ethylene to a total pressure of 10 Kg/cm$^2$.G, and thus a polymerization was started. The polymerization was continued for 1 hour while introducing ethylene continuously to maintain the total pressure at 10 Kg/cm$^2$.G. Then, the polymer slurry was transferred into a beaker and the hexane removed under reduced pressure to give 139 g of a white polyethylene having a melt index of 1.1 and a bulk density of 0.28. The catalyst activity was 2390 g.polyethylene/g.solid.hr.C$_2$H$_4$ pressure. The flow parameter was 1.70. Thus, the polyethylene had a high bulk density and a wide molecular weight distribution and it was obtained in extremely high activity.

EXAMPLE 7

40 g of magnesium oxide and 133 g of aluminum trichloride were reacted together under heating at 250° C. for 5 hours. 10 g of the reaction product, 1 g of 1,2-dichloroethane and 2.1 g of titanium tetrachloride were placed in the ball mill pot described in Example 6, and a ball milling was performed for 16 hours at room temperature and under a nitrogen atmosphere. The resulting powdered solid contained 40 mg of titanium per gram of the solid.

Using 10 mg of the powdered solid prepared above, a polymerization was made for 1 hour in the same procedure as in Example 6 to yield 171 g of a white polyethylene having a melt index of 0.92, bulk density of 0.29 and flow parameter of 1.68. The activity was 2950 g./g.solid.hr.C$_2$H$_4$ pressure. Thus, the polyethylene had a high bulk density and a wide molecular weight distribution and it was obtained in high activity.

EXAMPLE 8

40 g of magnesium oxide and 266 g of aluminum trichloride were reacted together under heating at 400° C. for 3 hours. 10 g of the reaction product, 1 g of trichlorobenzene and 2.1 g of titanium tetrachloride were placed in the ball mill pot described in Example 6, and a ball milling was performed for 16 hours at room temperature and under a nitrogen atmosphere. The resulting powdered solid contained 39 mg of titanium per gram of the solid.

Using 10 mg of the powdered solid prepared above, a polymerization was made for 1 hour in the same procedure as in Example 6 to yield 161 g of a white polyethylene having a melt index of 0.97, bulk density of 0.30 and flow parameter of 1.71. The activity was 2780 g./g.solid.hr.C$_2$H$_4$ pressure. Thus, the polyethylene had a high bulk density and a wide molecular weight distribution and it was obtained in high activity.

EXAMPLE 9

40 g of magnesium oxide and 67 g of aluminum trichloride were reacted together under heating at 300° for 4 hours. 10 g of the reaction product, 1 g of benzyl chloride and 2.2 g of a titanium trichloride eutectic mixture (TiCl$_3$.1/3AlCl$_3$) were placed in the ball mill pot described in Example 6, and a ball milling was performed at room temperature and under a nitrogen atmosphere. The resulting powdered solid contained 40 mg of titanium per gram of the solid.

Using 10 mg of the powdered solid prepared above, a polymerization was made for 1 hour in the same procedure as in Example 6 to yield 140 g of a white polyethylene having a melt index of 0.76, bulk density of 0.28 and flow parameter of 1.75. The activity was 2410 g./g.solid.hr.C$_2$H$_4$ pressure.

EXAMPLE 10

40 g of magnesium oxide and 133 g of aluminum trichloride were reacted together under heating at 300° C. for 4 hours. 10 g of the reaction product, 1 g of hexachloroethane, 1 g of vanadium tetrachloride and 2.1 g of titanium tetrachloride were placed in the ball mill pot described in Example 6, and a ball milling was performed for 16 hours at room temperature and under a nitrogen atmosphere. The resulting powdered solid contained 38 mg of titanium per gram of the solid.

Using 10 mg of the powdered solid prepared above, a polymerization was made for 1 hour in the same procedure as in Example 6 to yield 146 g of a white polyethylene having a melt index of 1.0, bulk density of 0.31 and flow parameter of 1.74. The activity was 2520 g./g.solid.hr.C$_2$H$_4$ pressure.

EXAMPLE 11

In the same manner as in Example 6, 1000 ml of hexane, 1 millimile of triethylaluminum and 10 mg of the powdered solid obtained in Example 6 were placed in the autoclave and the temperature was raised to 85° C. Then, hydrogen was introduced to a total pressure of 4.2 Kg/cm$^2$.G and subsequently an ethylene-propylene gas containing 2 mole % of propylene was introduced so as to maintain the pressure in the autoclave at 10 Kg/cm$^2$.G, under which condition a polymerization was made for 1 hour to yield 144 g of a white polyethylene having a melt index of 1.22, bulk density of 0.29 and flow parameter of 1.68. The activity was 2480 g.polymer/g.solid.hr.C$_2$H$_4$ pressure.

We claim:

1. A process for preparing polyolefins wherein olefins are polymerized or copolymerized using as catalyst a solid component and an organometallic compound of a metal of Group I to IV of the Periodic Table, characterized in that said solid component is a substance selected from the group consisting of a substance obtained by the copulverization of (1) a reaction product resulting from a heat reaction of magnesium oxide and aluminum trichloride at an Al/Mg atomic ratio of from 0.3 to 5 at a temperature of from 150° C. to 600° C. and (2) a titanium compound and/or a vanadium compound, and a substance obtained by copulverization of (1) a reaction product resulting from a heat reaction of magnesium oxide and aluminum trichloride at an Al/Mg atomic ratio of from 0.3 to 5 at a temperature of from 150° C. to 600° C., (2) a titanium compound and/or a vanadium compound and (3) an organic halide.

2. A process according to claim 1 wherein said reaction product of (1) is a product obtained by the reaction of magnesium oxide and aluminum trichloride at an Al/Mg atomic ratio from 0.6 to 1.5 at a temperature from 250° C. to 400° C. for 1 minute to 10 hours.

3. A process according to claim 1 wherein said solid component contains 0.5 to 10% by weight of titanium and/or vanadium.

4. A process according to claim 1 wherein a titanium compound and a vanadium compound are used together at a V/Ti molar ratio ranging from 2/1 to 0.01/1.

5. A process according to claim 1 wherein the weight ratio of said reaction product of (1) to said organic halide of (3) is in the range of from 1:0.5 to 1:0.01.

6. A process according to claim 1 wherein said polymerization or copolymerization is made at a temperature ranging from 20° to 120° C. and at a pressure ranging from atmospheric pressure to 70 $Kg/cm^2.G$.

7. A process according to claim 1 wherein said organometallic compound is selected from the group consisting of organoaluminum and organozinc compounds.

8. A process according to claim 1 wherein said olefin is selected from the group consisting of ethylene, propylene and butene-1.

* * * * *